April 12, 1966          M. PAULL          3,245,312

SOUND SYSTEM FOR PICTURE SLIDES

Filed May 4, 1962          5 Sheets-Sheet 4

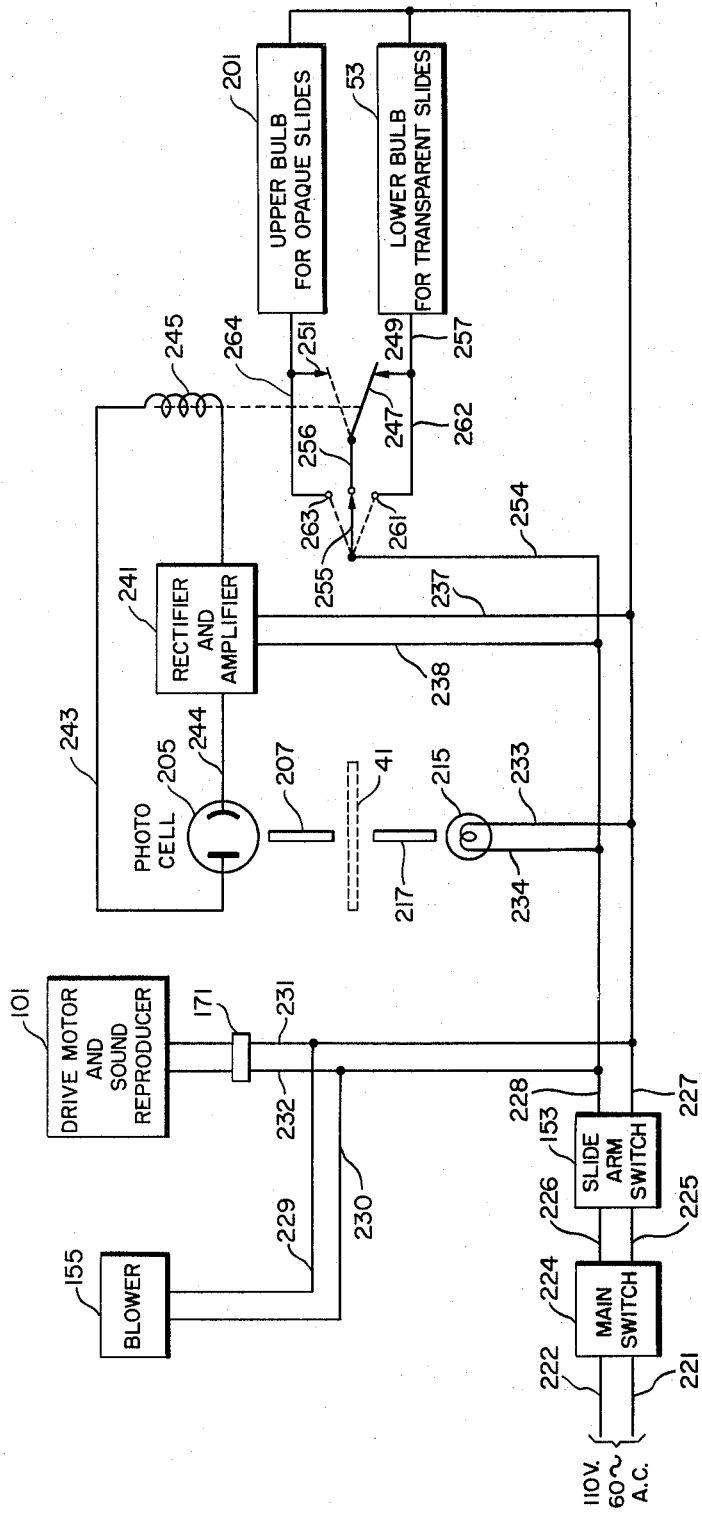

United States Patent Office 3,245,312
Patented Apr. 12, 1966

3,245,312
SOUND SYSTEM FOR PICTURE SLIDES
Morris Paull, Rochester, N.Y., assignor to Atron Corp., Rochester, N.Y., a corporation of New York
Filed May 4, 1962, Ser. No. 192,479
10 Claims. (Cl. 88—28)

This invention relates to a sound system for picture slides, especially but not exclusively for slides intended for home projection and the like.

An object of the invention is the provision of a simple, satisfactory, and economical system for reproducing sound (whether it be voice or music or both) in connection with each individual slide of a series of slides when projected onto a viewing screen.

Another object is the provision of simple and satisfactory mechanism for recording the desired sound effects (whether voice or music or both) in connection with individual picture slides, and for changing the recorded sound effects from time to time, as desired.

A further object is the provision of a sound recording system individual to each separate picture slide, so that the individual slides of a group of slides may be projected in any order desired, and the appropriate sound effects for each individual slide will be properly reproduced when the slide is projected, thus overcoming the disadvantage inherent when sound effects are recorded on a strip of tape or other kind of sound record applying to several slides, in that the slides must be projected in the same order in which the corresponding sound effects are projected.

A further object is the provision of a sound recording and reproducing system adaptable to conventional slides mounted in conventional cardboard mounts of the customary size of 2 x 2 inches.

A still further object is the provision of a generally improved and more satisfactory sound system for use with slides.

These and other desirable objects may be attained in the manner disclosed as an illustrative embodiment of the invention in the following description and in the accompanying drawings forming a part hereof, in which:

FIG. 8 is a schematic wiring diagram of the electrical connections for the apparatus.

One aspect of the present invention comprises a novel sound record unit to be associated with an individual picture slide and to remain associated therewith during storage, during transportation and handling, and during projection of the picture contained on the slide. Another aspect of the invention comprises simple and effective apparatus for projecting the picture on the slide and for simultaneously reproducing or "playing" the sound record individually associated with the slide, while the slide is being projected onto a viewing screen. Preferably but not necessarily, the same apparatus or substantial parts thereof may also be utilized for initially recording the desired sound effects (voice or music or other sounds or any desired combination thereof) on the individual record which is associated with the slide, or for changing a recording previously made, although it is within the contemplation of the invention to make the sound record on a different piece of apparatus, separate and distinct from the apparatus which projects the picture and reproduces the sound.

Figure 4:
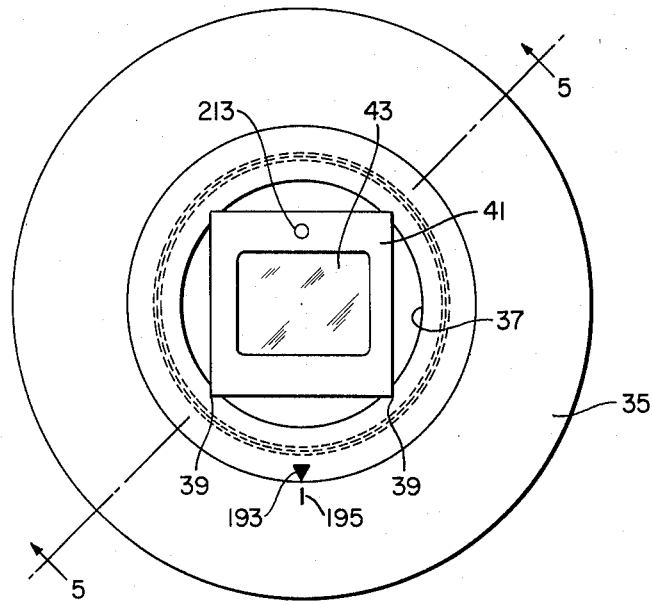
FIG. 4 is a plan of a slide and sound record in assembled relation to each other but removed from the projecting and reproducing apparatus.
Figure 5:
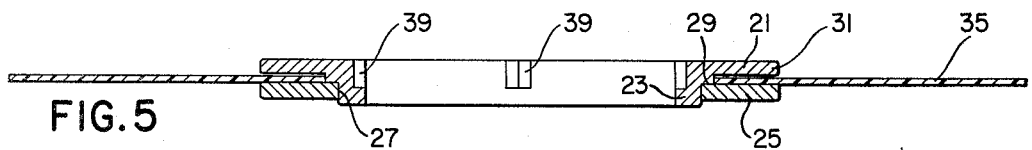
FIG. 5 is a diametrical section through the sound record and slide holding unit, substantially on the line 5—5 of FIG. 4, but on a larger scale than FIG. 4, and with the slide removed.
Figure 7:
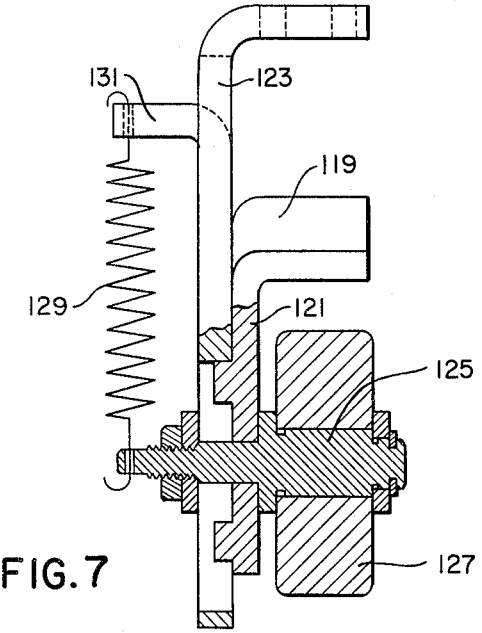
FIG. 7 is a vertical section through the same, taken substantially on the line 7—7 of FIG. 6.
Figure 6:
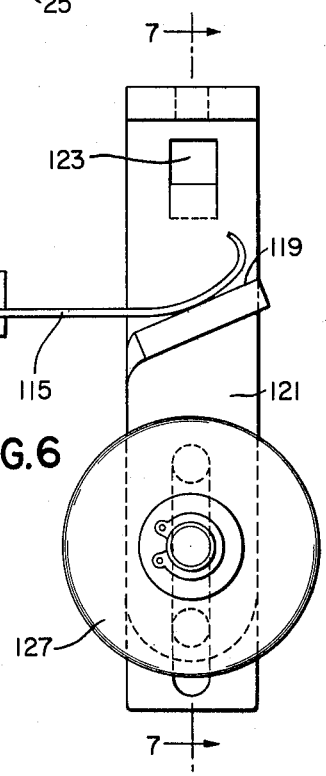
FIG. 6 is a fragmentary side elevation of an idler wheel assembly for holding the sound record in contact with its driving wheel.

Referring now to FIGS. 4 and 5, showing details of the sound record unit, this comprises an annular hub of suitable material (e.g., molded plastic material) which serves as a holder for retaining a picture slide in central relationship to the hub and as a bearing for an annular sound record which rotates around the hub while the hub remains stationary in picture-projecting position. The hub is made of two pieces, a first annular member 21 having an axially thickened inner rim 23, and a second annular member 25 which is merely a simple annular ring of uniform thickness, the inner periphery of which has a tight press fit on a circular shoulder 27 formed on the first member 21. A radial shoulder 29 serves as a stop to limit the motion of the ring 25 toward the radial flange 31 of the first hub member 21, so as to leave a space between the parts 25 and 31. In this space is the inner margin of a circular annular sound record 35, preferably of plastic flat disk form, and adapted to carry a sound recording either of the grooved type or of the magnetic type, both types being well known in the sound recording art, the details of the sound recording being unimportant and subject to wide variation so far as the present invention is concerned.

The two parts 21 and 25 of the hub are preferably of a plastic material having a relatively low coefficient of sliding friction with respect to the material of which the sound record 35 is made. For example, the sound record 35 may be of polyethylene or other material which is suitable for record grooving or for carrying the desired magnetic recording coating, and the hub members 21, 25 may be of low-friction material such as nylon or that sold under the trademarks "Teflon" or "Delrin," which may be impregnated with molybdenum disulphide to reduce still further the coefficient of friction, so that the sound record 35 will rotate on the hub 21, 25, smoothly and with great ease.

The first hub member 21 has a central aperture or window of at least the area of the photographic transparency which is to be projected. The central aperture need be no larger than the effective projectable area of the transparency, and thus it may be of square or rectangular shape, depending upon the kind of transparency. But for manufacturing ease and for saving material and minimizing weight of the hub assembly, the central aperture is preferably circular as shown at 37, with an internal diameter just slightly less than the diagonal of the slide mount. With a slide or transparency mount of the usual two inch square size, the aperture has a diameter slightly less than 2.8 inches, and has four equally spaced notches 39 extending from one face of the hub part way but not all the way through the axial thickness thereof. The notches are of proper shape and dimensions to receive snugly the four corners of the standard 2 x 2 inch slide mount, with a tight frictional press fit. Such a slide mount is commonly but not necessarily made of cardboard, and is indicated at 41 in FIG. 4, and it forms a frame around the photographic transparency 43. The user may press a slide into the notches of the hub, and may press it out again whenever desired, but so long as it remains in the hub the slide, the hub, and the sound disk or record rotatable on the hub together form an assembly of parts which are handled together as a unit.

This assembly or unit, per se, constitutes one aspect of the present invention. Any suitable means may be employed for holding the hub and the slide stationary in the beam of light of an optical projector, so that the picture or other image on the slide may be projected onto a viewing screen, and for simultaneously rotating the sound record 35 around the stationary hub and in cooperative relation to a sound reproducing or playback "head," so that the previously recorded sound may be heard simultaneously with viewing the image on the viewing screen. A preferred form of such means constitutes another aspect of the present invention, which will now be described with special reference to FIGS. 1, 2, 3, 6, and 7 of the drawings.

A suitable casing or housing 51 (FIGS. 1 and 2) contains on optical projection system, which may be of conventional form. The details thereof are not important for purposes of the present invention, and may be widely varied. For example, there may be a suitable source of light such as the electric projection bulb or lamp 53 having a reflector 55 below it and a condenser lens 57 above it, to project a beam of light vertically upwardly through a heat-absorbing transparent member 58 and through the transparency 43 which, with its retaining hub, is held in a horizontal position, with the axis of the hub arranged vertically and alined with the optical projection axis. Above the transparency, the light beam is reflected by any suitable reflecting means such as the prism 59, and thence passes horizontally forwardly through the projection lens system 61 which is mounted in the focusing mount 63, and onto a conventional viewing screen at a suitable distance in front of the projector.

For conveniently placing the slide and sound record assembly in its viewing and playing position, there is what may be called a loading arm 71 mounted to swing in a horizontal plane on a vertical axis formed by a pivot screw 73 screwed into a fixed part 75 within the casing 51. A light spring 77 has one end fixed to the stationary member 75, and the other end engages the loading arm 71, constantly tending to swing the loading arm in a clockwise direction when viewed from above as in FIG. 3, to cause the loading arm to project outwardly through an opening 79 in the side wall of the casing or housing 51. This outwardly projecting position is the loading and unloading position of the arm, and is shown in full lines in FIG. 3, whereas the projecting and playing position of the arm is shown in broken lines in the same view. A short laterally extending handle 81, one end of which is secured to the loading arm at 83, has an accessible finger piece 85 at its other end. By grasping the finger piece and pushing it laterally inwardly toward the center of the apparatus, the user easily swings the loading arm laterally inwardly against the force of the spring 77, from the loading position shown in full lines in FIG. 3 to the picture projecting and record playing position shown in dotted lines, in which latter position it is latched by latching mechanism as described below.

At the free end of the loading arm 71 (that is, the end remote from the pivot 73) the arm is of generally circular configuration (see FIG. 3) as shown at 91, with a central square opening 93 of sufficient size to accommodate the picture area of a slide regardless of whether the picture was taken with the long axis horizontal or vertical. Near the four sides of the square opening 93, but spaced outwardly from them, are four upstanding lugs or projections 95, each having a straight inner edge and an arcuate outer edge as shown, these projections 95 being of such size and location that they will extend upwardly through the arcuate spaces or gaps between the slide mount 41 and the inner edge 37 of the hub, when a slide and hub assembly is lowered downwardly onto the loading arm. Outwardly extending shoulder portions 97, of less height than the projections 95, serve to support the hub structure 23, etc., at a sufficient elevation above the main surface of the arm 71 to insure that the sound record 35 can rotate freely without rubbing on the arm.

Mounted within the housing or casing 51 is a sub-assembly or unit 101 (FIG. 2) which may be called the sound unit. It includes an electric motor which drives a horizontal shaft 103 at an elevation somewhat below the swinging arm 71, and also drives longitudinally a sound reproducing arm 105 at a level or elevation somewhat above that of the swinging arm 71. The details of the mechanism within the unit 101 are not important for purposes of the present invention, and it is sufficient for present purposes to said that the unit 101 may contain any known form of electric motor geared to turn the shaft 103 and also geared to advance longitudinally the member 105, which carries the sound record pick-up element, either a needle in the case of a grooved sound record, or preferably a magnetic pick-up as shown schematically at 107, for use with the preferable magnetic type of sound record.

The above mentioned shaft 103 carries a gear 109 which meshes with a gear 111 on a second shaft parallel to the shaft 103 and suitably supported. The shaft of the gear 111 in turn has fixed to it a friction drive wheel 113, the top edge of which is at the level of the bottom surface of the sound record 35, at a point radially near the outer edge thereof, when the arm 71 has been swung into the machine from the loading position shown in FIG. 3 to the playing and projecting position illustrated in broken lines in the same figure.

As the arm swings into its projecting position, a leaf spring 115 carried by an upstanding bracket 117 fixed to the arm engages an inclined cam surface 119 on an idler slide 121 which is movable vertically on a stationary guide 123, thereby moving the slide 121 vertically downwardly so that a short horizontal shaft 125 carried by the slide 121 is moved down. This lowers an idler wheel 127 rotatable on the shaft 125, to bring the idler wheel down into contact with the top surface of the sound record 35, directly over the driven friction wheel 113, pressing the sound record firmly against the friction drive wheel 113 so that the rotation of the latter causes the sound disk 35 to rotate on the hub 21, 25, which hub, however, is held stationary and prevented from rotation by the projections 95 which extend upwardly into the hub.

A spring 129, having its lower end secured to the shaft 125 and its upper end secured to a fixed bracket 131, constantly tends to raise the slide 121 and the idler wheel 127. However, the downward pressure of the spring 115 is greater than the upward pull of the spring 129, so that the idler wheel 127 is held firmly engaged with the top face of the sound record, so long as the carrying arm 71 remains in the picture-projecting and sound-reproducing position. A stationary support 132 (FIG. 2) underlies the free end of the arm 71 when the arm is swung inward to picture-projecting position, to hold the arm accurately at the intended elevation and to prevent downward deflection thereof by any downward force such as gravity or the downward pressure of the wheel 127.

As the slide-carrying arm 71 is swung all the way inwardly to its projecting position, an inclined projection 133 on the top of one of the members 95 raises the latching pawl 135 which is pivoted at 137 to a stationary bracket member 139 and which is urged by a spring 141 toward latching position. The inclined portion 133 then snaps past the end of the latching pawl 135 so that the latching pawl engages behind a vertical face of the projection 133 and holds the slide arm 71 in projection position, against the force of the spring 77 which tends to swing the arm outwardly to loading position. Simultaneously with reaching projecting position and being latched therein, a projection 151 on the arm engages a pressure sensitive switch 153 and closes this switch.

In a simple form of the present invention, the closing of the switch 153 closes the circuit to the unit 101, and also the circuit to a blower 155 which serves to blow cooling air through the housing, and also the circuit to the illumination bulb 53, so that light therefrom will shine through the picture area 43 of the slide to be projected. In a more versatile form of the present invention, the closing of the switch 153 will not necessarily illuminate the bulb 53 but may illuminate a second bulb for directing light onto the upper face of the slide picture 43, for the purpose of projecting matter from an opaque slide, rather than a transparency, as will be further described below. But in either case, whether the apparatus is of the simple form for projecting only transparencies, or whether it is of the more versatile form for projecting opaque slides as well as transparencies, the swinging of the slide arm 71 into projection position automatically closes the necessary circuits to illuminate the slide, to start the blower, and to start the sound reproducing mechanism.

When the unit 101 is set into operation, the shaft 103 will begin to rotate, and through the gears 109 and 111 this will rotate the friction drive wheel 113, thereby rotating the sound record 35 on the stationarily held hub 21, 23, 25. The slide 41, 43 will be held stationary, however, within the hub and the picture thereon will be projected onto the viewing screen in front of the projection lens 61.

Meanwhile, when the shaft 103 begins to rotate, the mechanism within the unit 101 will advance the pick-up member 105 longitudinally, so that the magnetic pick-up head 107 thereon will follow the spiral sound track magnetically recorded on the record 35, as the record is being turned by the friction drive wheel 115. The sound which was previously recorded on the record 35 will be reproduced by the action of the magnetic pick-up 107 in conjunction with the usual sound reproducing circuits which constitute part of the unit 101, these circuits being well known in themselves and commonly used in the sound reproducing art, such as in tape recorders, office dictating machines, and the like, so the circuits are not shown here in detail since the exact construction thereof is unimportant for purposes of the present invention. It is sufficient to say that the sound as picked up from the sound record 35 by the magnetic pick-up head 107 (or by a needle following a groove in the sound record, if it is preferred to use a grooved recording rather than a magnetic recording), is amplified to the required volume, and is reproduced through a loud speaker shown schematically at 161 suitably mounted within the housing 51, the sound coming out easily and clearly through the louvers 163 on the top of the housing, which louvers serve also as ventilation openings.

Figure 2:
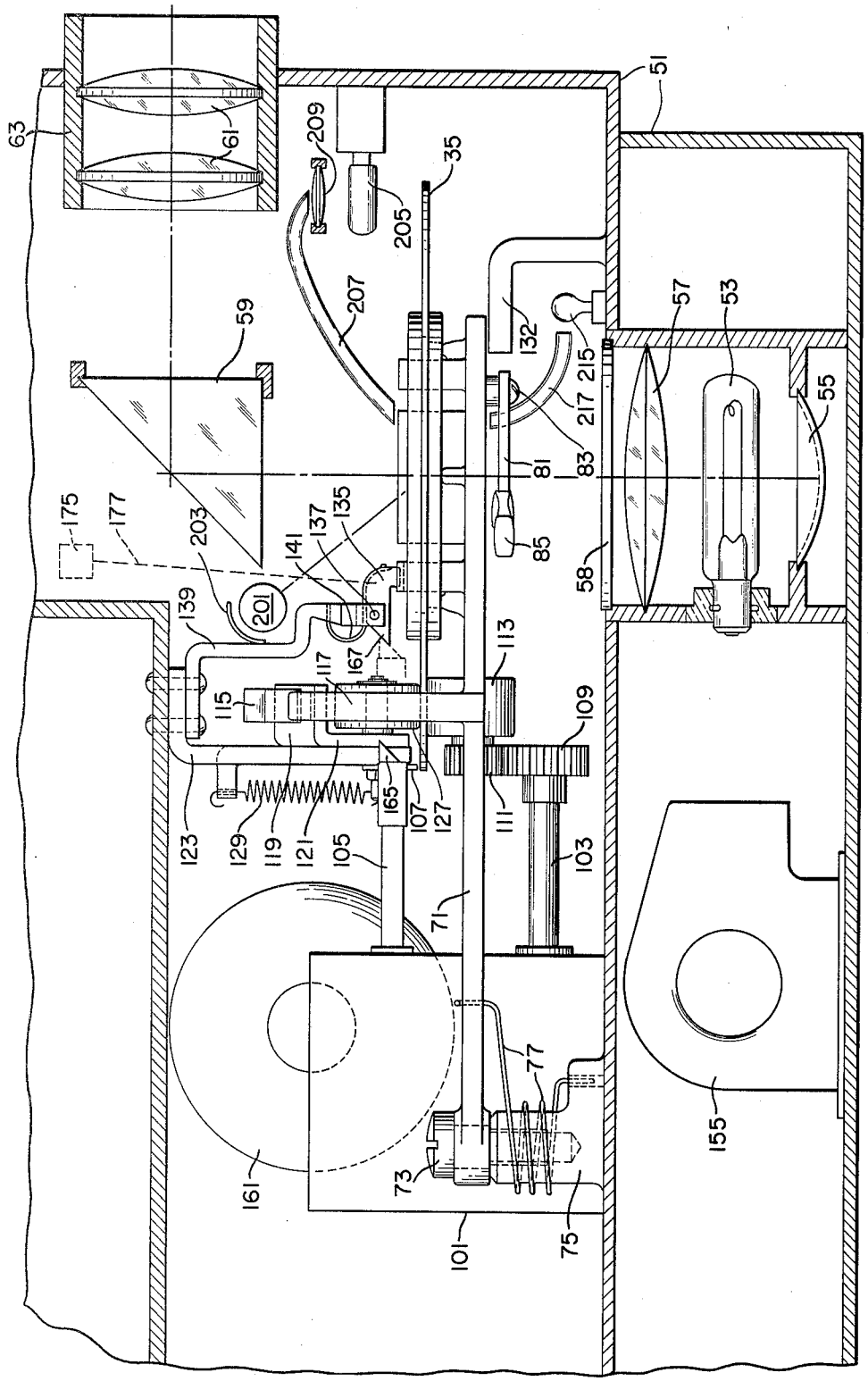
FIG. 2 is a somewhat schematic vertical section through the same, taken mainly along the optical axis of the projector.
Figure 3:
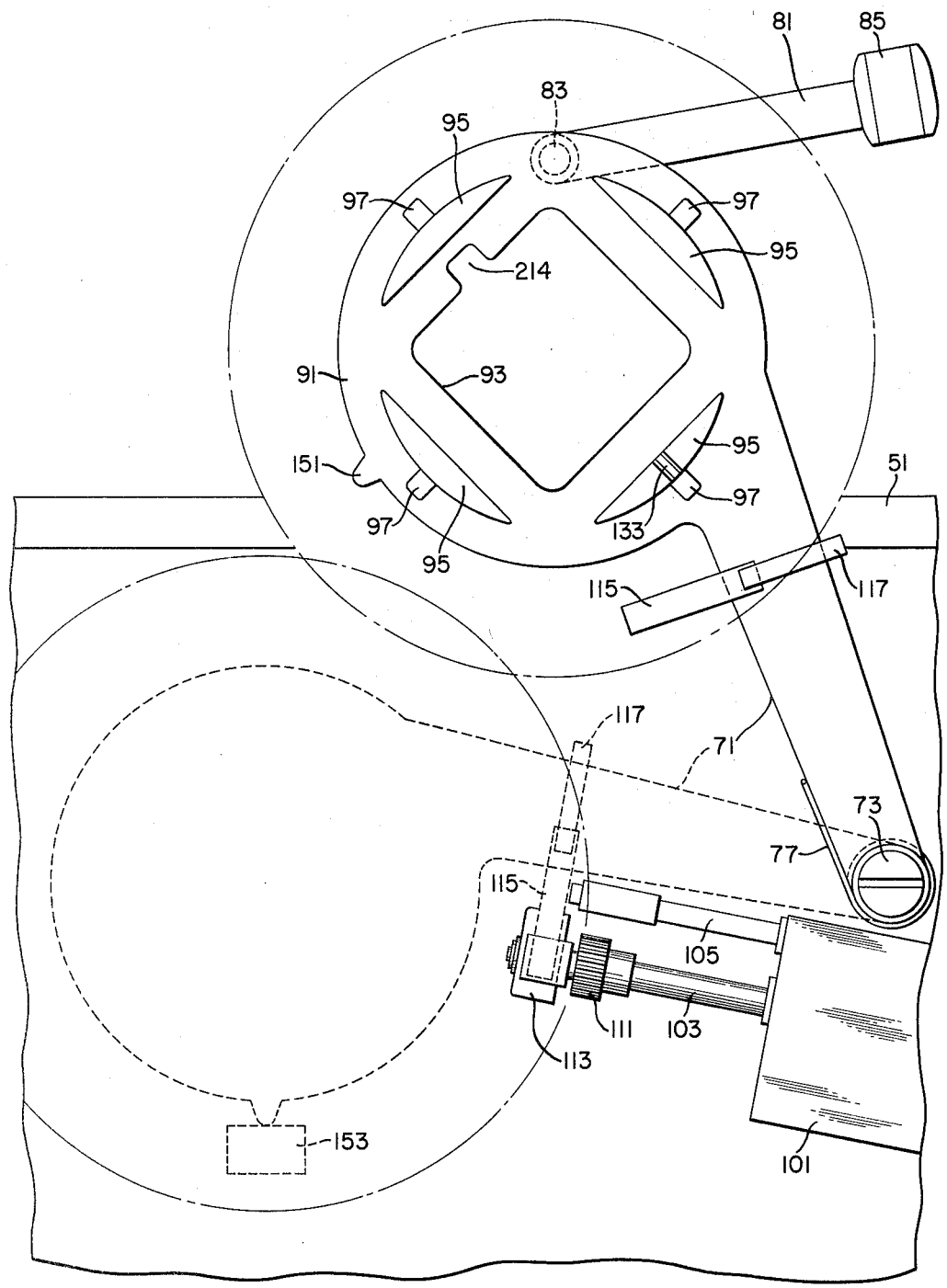
FIG. 3 is an enlarged plan of a fragment of the apparatus with the cover and certain overlying parts removed, illustrating the slide and record holding arm in its loading and unloading position in full lines, and in its projecting and playing position in broken lines.

As the playing of the sound record continues, the arm 105 and pick-up 107 moving radially or approximately radially toward the center of the sound record disk 35, an inclined camming nose 165 on the advancing end of the arm 105 finally reaches the position shown in dotted lines in FIG. 2, as the playing of the record is completed, and engages against an inclined cam surface 167 on the latch 135. This serves to swing the latch in a counterclockwise direction when viewed as in FIG. 2, on its pivot 137, against the force of the spring 141, releasing the latch so that the spring 77 swings the arm 71 laterally outwardly to its loading and unloading position shown in full lines in FIG. 3. As the slide arm 71 swings clockwise (viewed from above as in FIG. 3) the movement of the projection 151 away from the pressure switch 153 opens this switch, thus turning off the illumination and stopping the driving motor and the blower, the sound reproducing arm 105 being automatically retracted by suitable spring means back to its initial starting position ready for starting at the outer edge of the next sound record.

This completes the cycle of operation as to any one individual slide and sound record. With the slide arm 71 now in its outer position, it is easy to lift the slide and sound record vertically upwardly off of the holding projections 95 on the slide arm, and to place another slide and sound record on the slide arm, whereupon the slide arm is once more swung inwardly (by manual pressure on the finger piece or handle 85) which automatically starts another cycle. The picture on the slide is thereby projected onto the viewing screen, and simultaneously the sound on the accompanying sound record or disk is reproduced audibly.

In case it may be desired to project pictures only, without reproducing the accompanying sound record, a manual switch 171 (FIG. 8) controlled by a knob 173 (FIG. 1) may be turned off, thus making the sound reproducing unit 101 ineffective. Then when the slide carrying arm 71 is swung to its inward or projection position, it will close the switch 153 just as before, so that the picture will be illuminated and projected, but the sound reproducing system will remain ineffective. Because the sound reproducer does not operate, the cam edge 165 thereof will not engage with the cam edge 167 of the latch 135, to release the latch automatically. Therefore, when the picture has been viewed long enough and it is desired to change the picture, the operator may press a knob or button 175 (FIG. 1) which is mechanically connected to the latch 135 by any suitable mechanical linkage such as that indicated schematically at 177 in FIG. 2, thereby releasing the latch 135 independently of the action of the sound reproducing unit. Upon release of the latch, the spring 77 will swing the arm 71 outwardly from its projection position to its loading position.

The volume of the reproduction, when the sound reproduction feature is used, may be controlled by a volume control knob 181 (FIG. 1) similar to the volume control of any conventional sound reproducing system such as is used on tape recorders, office dictating machines, etc.

Figure 1:
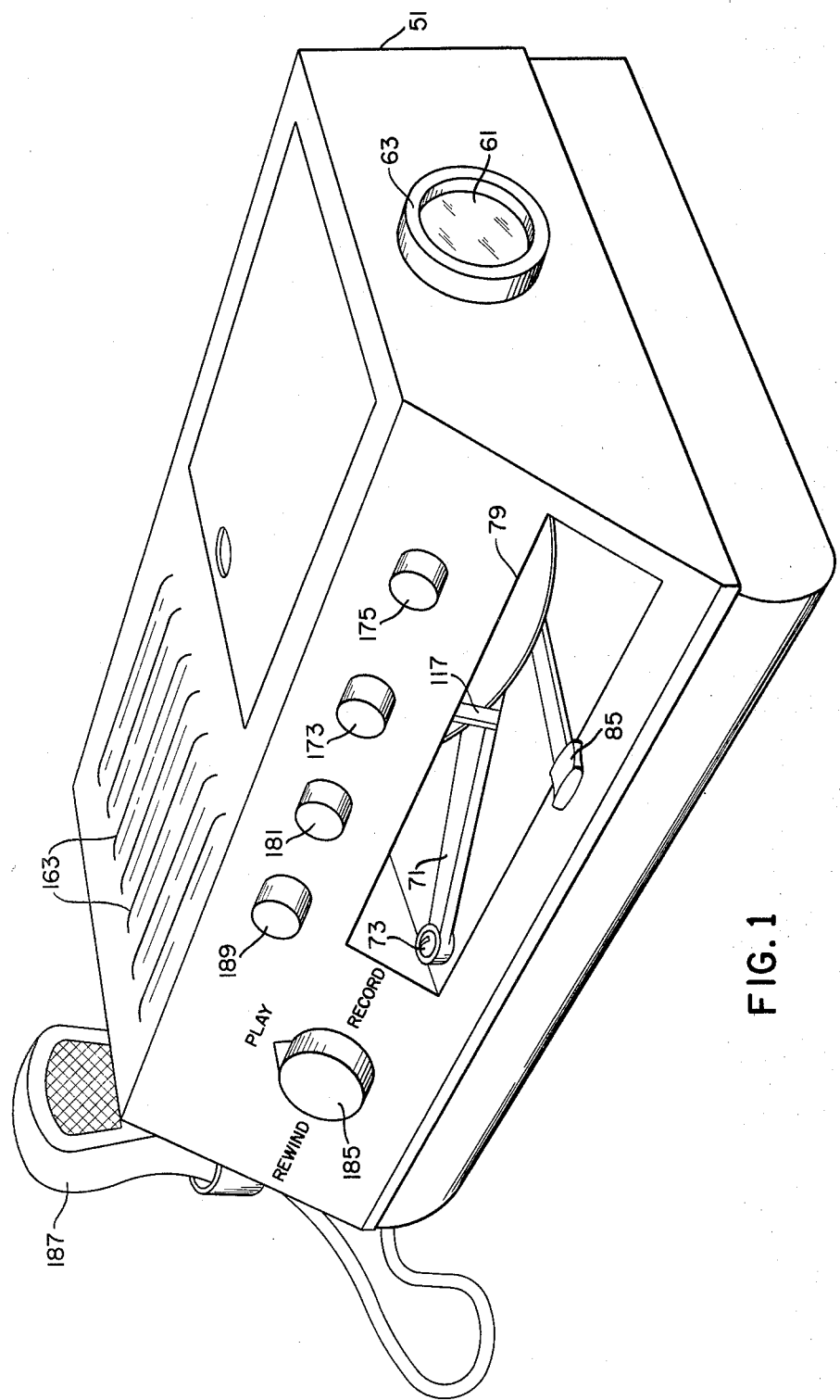
FIG. 1 is a perspective view of slide projecting and sound reproducing apparatus in accordance with a preferred embodiment of the invention.

The user may make his own sound record, according to the preferred embodiment of the invention, by turning the control knob 185 from the "play" position shown in FIG. 1, to the "record" position. The details of the circuits are not illustrated here because such details are unimportant for purposes of the present invention, and suitable circuits for purposes of the present invention are well known in the art, particularly in the field of tape recorders and office dictating machines. When the control knob is turned to the "record" position, the user may speak into the microphone 187, and by means of a suitable start and stop switch 189 he may start and stop the sound unit 101 as required, while making a record on any particular disk. When the switch 189 is operated to activate the unit 101, the shaft 103 will rotate to cause the sound record disk 35 to rotate, and simultaneously the arm 105 will be driven radially or approximately radially toward the center of the rotating sound disk, so that the magnetic recording head 107 thereon produces a spiral magnetic sound track on the record disk 35, just as is done on the records of the well known spiral magnetic type of office dictating machine. As well understood in this field, one can dictate over a previous recording, automatically erasing the previous recording during the progress of the new dictation, so that the same sound record slides may be used over and over again with new dictation for new pictures, if desired. Because of the fact that the frame or mount 41 of the slide is simply held frictionally at its corners in the hub of the sound record, the picture slide can be very easily and quickly removed from the hub by axial pressure exerted on the slide from beneath, without damaging either the hub or the mount of the picture slide. Thus when the user becomes tired of a particular set of pictures, he can remove these pictures from his hubs, insert new picture slides in the hubs, and dictate new dialogue to go with the new slides, without having to go to the expense of purchasing new sound record units for the new slides. This makes the construction very economical for protracted use under varying conditions. But of course the original recording need not be changed, and it can be used over and over again as many times as desired, either with the original slide or with a new slide for which the same original sound record would still be appropriate.

In order to have a definite predetermined starting position of the spiral sound track with respect to the magnetic head 107, it is desirable always to place the sound record in the machine in a definite position of orientation. This is preferably accomplished by providing an index mark 193 (FIG. 4) on each hub, and an index mark 195 near the inner edge of each sound record 35. The operator should understand that when the picture and the sound record unit is loaded onto the arm 71, it should be done with the index mark 193 in a definite predetermined position with respect to the arm (such as being faced toward the pivot 73, for example) and with the record 35 rotated to bring its index mark 195 opposite the index mark 193 of the hub. The index mark 195 need not interfere in any way with the last few convolutions of the spiral sound recording, as it can be marked by means of a non-magnetic pigment which will not in any way affect the underlying magnetic recording coating on the disk.

The construction as thus far described is admirable for the projection of transparencies, which constitute the great bulk of pictures for home projection or amateur projection, and also admirable for the easy making of sound records so that each user may easily and quickly record any desired accompaniment (dialogue or music or any combination of the two) to go with a picture which he may wish to project. For the user who may occasionally wish to project opaque slides (by reflected light) rather than transparencies (by transmitted light), a more versatile form of equipment may be provided, having all of the same features above described, plus a few additional features which will now be described with particular reference to FIGS. 2 and 8.

In this more versatile form of construction, a second illuminating lamp 201 is provided, mounted with a reflector 203 to direct the beam of light onto the top surface of the slide, so that whatever appears on the top surface will be illuminated for projection by reflected light. When a transparency is to be projected, the bulb 53 is illuminated and the second bulb 201 is not turned on. When it is desired to project an opaque slide, the bulb 53 is preferably dark (although it could be illuminated, since the light would not come through an opaque slide) and the bulb 201 is illuminated. Preferably there is means for automatically switching from one bulb to the other, as may be required.

The automatic switching means of the present invention is controlled by a photocell, which receives light when one kind of slide is used, but not when the other is used, and the output circuit of the photocell serves to control the switching from one illumination bulb to the other. The photocell is shown at 205. To enable it to be mounted in an offset position out of the way of the optical axis of projection, it receives light through a Lucite rod 207 which, as well known in the optical field, has the property of transmitting light axially along the rod with very little lateral loss through the sides of the rod, even when the rod is bent around curves. Thus one end of the Lucite rod 207 may be located near the slide 41, 43 to be projected, as shown in FIG. 2, while the other end of the rod may be near the photocell 205 at any convenient distance from the slide, the light from the exit end of the Lucite rod being focused on the photocell, if desired, by means of a lens 209.

Conveniently, the lower or entrance end of the Lucite rod may overlie one corner of the picture area of the slide, to receive a small amount of light coming through the slide without appreciably interfering with projection of the picture. With such an arrangement, light will come through if the slide is a transparency, and will be conducted along the Lucite rod 207, activating the photocell 205, which in turn activates a relay to keep the lamp 53 lit (after an initial interval of illumination in any event) and to keep the lamp 201 extinguished. If the slide happens to be an opaque slide rather than a transparency, obviously no light will pass through the slide and therefore the rod 207 and the photocell 205 will remain dark, and after a short initial interval of illumination of the lamp 53 (controlled by any known form of time lag mechanism) the lamp 53 will be extinguished and the relay will close the switch to light the lamp 201.

While this construction just described is possible, it is nevertheless preferred to arrange the mechanism somewhat differently. In the preferred form, the light conducted by the rod 207 for illuminating the photocell 205 does not come through the slide, but rather comes through a special notch, recess, or hole which is provided in the mount or frame 41 of the slide when the slide is of the opaque type, no such notch or recess or hole being provided in the mount of a slide which is a transparency. Moreover, in the preferred form the light for activating the photocell comes from a special low power source of illumination or lamp which is provided for just this purpose.

The notch or recess or hole may take various forms, of course, a hole 213 being shown in FIG. 4 merely as an example. It may be referred to broadly as a "structural variation." It may have any convenient location in the frame or mount of the slide, provided it is always in the same location in all of the mounts of the opaque slides. The slide holding arm or loading arm 93 is recessed or notched as shown at 214 (FIG. 3) in alinement with the opening 213 in this type of slide. The lower end or entrance end of the rod 207 is directly over the position occupied by this opening 213 when an opaque slide is mounted in proper position on the arm 71 and when the arm 71 is swung inwardly and latched in its projection position. Illumination is preferably provided by a separate lamp 215 of low power. If there is insufficient space to mount the lamp 215 in position so that its direct rays will pass through the opening 213 of the slide mount, the lamp may be offset from such position and light from it may be conducted through a Lucite rod 217 to a position directly beneath the opening 213 in the mount, the light thence passing upwardly through the opening 213 (when such an opening exists) and into the Lucite rod 207, so as to activate the photocell 205.

With such an arrangement, the relay controlled by the photocell switches the bulb 201 on and the bulb 53 off, when light reaches the photocell, since this shows that it is an opaque slide rather than a transparent one which is in projection position. When the photocell is dark, the relay controlled thereby opens the circuit of the lamp 201 and closes the circuit to the lamp 53, since the photocell is dark when a transparency rather than an opaque slide is present in projection position, as the transparency has no light-transmitting opening in its frame or mount. Of course a reverse arrangement can be used, letting the photocell be illuminated when a transparency is to be projected, and letting it be dark when there is an opaque slide, and this is entirely possible especially when there is an independent photocell illuminating source such as the special bulb 215. But as a practical matter, most slides are transparencies and comparatively few of them are opaque, so only a few openings have to be cut or other structural variations provided in the slide mounts if a structural variation is the distinguishing characteristic of an opaque slide rather than a transparent one.

A wiring arrangement according to the present invention is shown schematically in FIG. 8. The leads 221 and 222 are plugged into any suitable source of current, such as conventional domestic alternating current. The circuit passes through a main control switch 224 which, when turned off, stops the flow of current to all parts of the mechanism, and when turned on, supplies current through the circuit wires 225 and 226, one or both of which pass through the slide arm switch 153, which is controlled by the position of the slide-carrying arm 71. From here, a main conductor 227 goes, as shown in FIG. 8, to one contact of the transparency illuminating bulb 53 and one contact of the opaque slide illuminating bulb 201.

Branching off of the conductor 227, a conductor or circuit wire 229 leads to one side of the cooling blower 155, and another circuit wire 231 leads through the switch 171 to one side of the sound unit 101. From the main conductor 227, another conductor 233 leads to one side of the special bulb 215 for illuminating the photocell, and another conductor 237 leads to one side of the rectifier and amplifier unit 241 of the photocell.

The return conductors or other side conductors from the various elements just mentioned are respectively shown at 230 from the blower 155, at 232 from the sound unit 101, at 234 from the special lamp 215, and at 238 from the rectifier and amplifier unit 241, all joining to the second-side main conductor 228.

The use of a rectifier and amplifier unit 241 is on the assumption that the photocell 205 requires direct current, which is furnished by the rectifier portion of the unit 241, from the alternating current supplied through the mains 221 and 222. If the photocell 205 is of a type which can operate on alternating current rather than direct current, then the rectifier portion of the unit 241 may be eliminated and only the amplifier portion thereof used. In either event, the photocell is operatively connected by conductors 243 and 244 to the unit 241 and to the relay whose coil is schematically shown at 245. The relay armature 247 normally makes contact at 249 when no current is flowing in the relay coil, the photocell 205 being dark. When the photocell is illuminated so that current flows in the coil 245, the armature 247 breaks the contact 249 and makes contact at 251.

The second side 228 of the main circuit is connected by a conductor 254 to a three-position switch 255, the middle position of which connects with a conductor 256 leading to the armature 247 of the relay. Thus, with the switch 255 in the central position, current is supplied through the conductor 254 and the switch 255 to the armature 247, and if the relay is in its normal or unactivated position, the current supply goes through the armature to the contact 249 and thence through the conductor 257 to the second contact of the bulb 53; that is, the contact on the opposite side of the bulb circuit from that connected to the conductor 227. Thus it is seen that the transparency illuminating bulb 53 will be lit whenever the main switch 224 and the slide arm switch 153 are closed, provided the photocell 205 is not illuminated and provided the three-way switch 255 is left in its normal central position.

On the other hand, if an opaque slide is in projection position, so that light from the bulb 215 passes through the opening 213 and activates the photocell 205, then the relay 245 shifts the armature 247 away from the contact 249 and into engagement with the contact 251, so that current cannot flow to the lamp 53, but does flow to the lamp 201 for illuminating the slide by reflected light. Thus the opaque slide and the transparency slides can be mixed with each other in any way desired, and the machine will automatically accommodate itself to either type of slide when it is inserted in proper projection position. If it is desired, however, to control this matter manually rather than automatically, as for example when one plans to project only one style of slide, the manual switch 255 may be shifted from its central position to the appropriate side position. When it makes contact with the contact 261, the relay armature 247 is disconnected from the effective circuit, and instead, current flows through the conductor 262 to the lamp 53. If the manual switch 255 is displaced to the other side contact 263, then current flows through the conductor 264 to the lamp 201. Of course in either case the lamp is illuminated only when the slide arm switch 153 is closed by swinging it to the proper projecting position.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A combined picture projector and sound reproducer for use with individual picture slides each having an individual sound record associated therewith, said projector and reproducer comprising, in combination, a housing having an opening in one wall thereof, a slide support movably connected to said housing and movable through said opening from a loading position at least partially projecting through said opening to an externally accessible position where a picture slide and sound record assembly may be loaded thereon, to a projection position at least mainly within said housing, an optical projector including slide illuminating means, sound reproducing means, a spring tending to move said support from projection position toward loading position, a releasable latch for holding said support in projection position against the force of said spring, means operated by movement of said support from loading position to projection position independently of the presence of a picture slide on said support for activating said illuminating means and said reproducing means, and means operated by movement of said reproducing means for releasing said latch.

2. A combined picture projector and sound reproducer for use with both transparent and opaque individual picture slides each having an individual sound record associated therewith, the transparent slides having a different shape than the opaque slides, said projector and reproducer comprising, in combination, a slide support movable from a loading position to a projection position, an optical projector including slide illuminating means, said illuminating means including one source of light for illuminating said picture slide from one side if it is a transparency and a second source of light for illuminating said slide from an opposite side if it is an opaque slide, sound reproducing means, means operated by movement of said support from loading position to projection position for activating said illuminating means and said reproducing means, and means controlled by the shape of the particular slide carried by said support for determining which of said two sources of light will be effective to illuminate said slide.

3. A construction as defined in claim 2, in which said means controlled by the shape of the slide includes a photoelectric cell.

4. A combined picture projector and sound reproducer for use with individual picture slides each having an individual sound record associated therewith, said projector and reproducer comprising, in combination, a housing having an opening in one wall thereof, a slide support movably connected to said housing and movable through said opening from a loading position at least partially projecting through said opening to an externally accessible position where a picture slide and sound record assembly may be loaded thereon, to a projection position at least mainly within said housing, an optical projector including slide illuminating means, sound reproducing means, and means operated by movement of said support from loading position to projection position for activating said illuminating means and said reproducing means independently of the presence of a picture slide on said support, said slide support comprising a pivoted arm mounted for substantially horizontal swinging movement about a substantially vertical pivotal axis.

5. A picture projector for projecting both transparencies and opaque pictures mounted in mounts which differ structurally from each other, said projector comprising a projection lens, means for holding a picture in projection position with respect to the lens, a first source of light for illuminating the picture from the side thereof which is optically remote from the lens if it is a transparency, a second source of light for illuminating the picture from the side thereof which is optically toward the lens if it is an opaque picture, and means including a light-responsive photoelectric cell for rendering one of said sources of light operative and the other thereof inoperative, said cell being so placed that the light reaching said cell is controlled at least in part by the structure of said picture mount.

6. A projector for both transparent slides and opaque slides, comprising illuminating means including a source of light for transparencies and a separate source of light for opaque slides, means operated by movement of a slide carrier to a projection position for activating said illuminating means, and light selection means controlled by the structure of the slide in projection position for determining which one of said sources of light will illuminate the slide when said illuminating means is activated.

7. A construction as defined in claim 6, in which said light selection means includes means for projecting a beam of light toward a slide to be projected, and switching means controlled by a photocell responsive to said beam of light.

8. The combination with a hub having a central opening for receiving a picture slide mount and a bearing for rotatably receiving an annular sound record rotatable around said hub, of a hub carrying member for holding the hub non-rotatably while allowing the sound record to rotate around it, said hub carrying member being shiftable from a loading position to a projection position, sound record rotating means including a friction wheel for engaging said annular sound record to rotate the same, means operated by movement of said hub carrying member to projection position for activating said record rotating means, an idler pressure wheel movable toward and away from said sound record approximately opposite the location where said friction wheel engages said sound record when said hub carrying member is in projection position, and means operated by movement of said hub carrying member to projection position for moving said idler pressure wheel toward said sound record to press said record into firm engagement with said friction wheel.

9. Combined picture projecting and sound reproducing means comprising a casing having an opening in one wall thereof, a slide loading arm pivoted in said casing for swinging movement from a projection position at least mainly within said casing outwardly through said opening to a loading position at least partly accessible outside of said casing, an annular hub having an external peripheral groove and an approximately circular central opening having a plurality of notches at intervals around the periphery of said opening, a picture slide mount having corners tightly engaged in and frictionally retained in said notches, an annular sound record rotatably mounted at its inner marginal edge in said external peripheral groove of said hub, projections on said slide loading arm extending into spaces between said slide mount and the periphery of said central opening of said hub to hold said hub and said slide mount in stationary position with respect to said loading arm without interfering with rotation of said sound record, a projection lens mounted in said casing, slide illuminating means within said casing, said loading arm when in projection position holding said slide mount in such position that a slide therein will be illuminated by said illuminating means and an image thereof will be projected by said lens, sound record rotating means mounted within said casing in position to engage and rotate said sound record when said loading arm is in projection position, and sound reproducing means including a sound pick-up member movable approximately radially with respect to said sound record while said record is being rotated by said rotating means.

10. A construction as defined in claim 9, further including means controlled by movement of said pick-up member for moving said loading arm outwardly from projection position to loading position when said pick-up member reaches a predetermined position.

References Cited by the Examiner

UNITED STATES PATENTS

| | | | |
|---|---|---|---|
| 954,408 | 4/1910 | Brown | 88—26 |
| 1,076,077 | 10/1913 | Thompson | 88—26 |
| 2,240,446 | 4/1941 | Volney | 88—28 |
| 2,704,008 | 3/1955 | Owens | 88—26 |
| 2,961,922 | 11/1960 | Schwartz et al. | 88—28 |
| 3,057,255 | 10/1962 | Bregman | 88—28 |
| 3,063,338 | 11/1962 | Bregman | 88—28 |

NORTON ANSHER, *Primary Examiner.*

E. G. ANDERSON, WILLIAM MISIEK, *Examiners.*